April 14, 1970   N. SHAYE   3,506,130
FILTER ASSEMBLY FOR APPARATUS USED IN PARENTERAL
ADMINISTRATION OF LIQUIDS
Filed Dec. 26, 1967
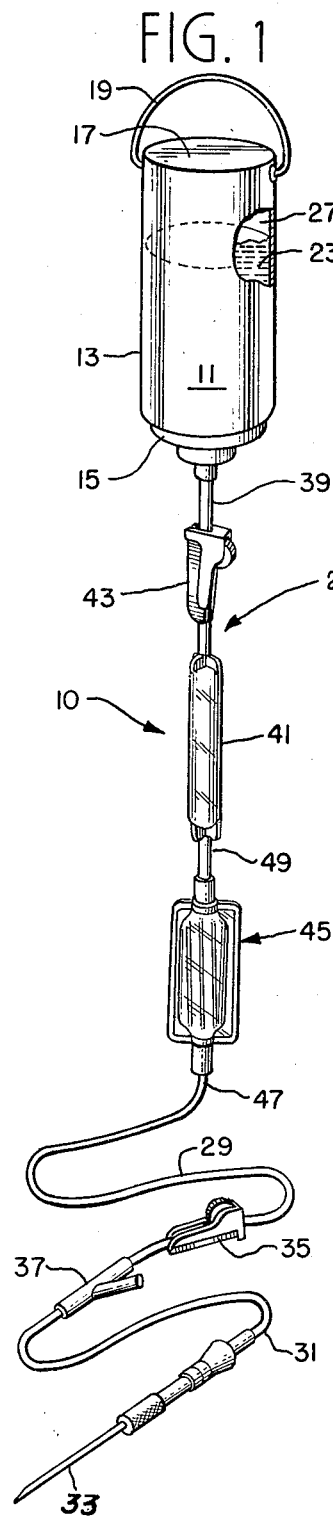
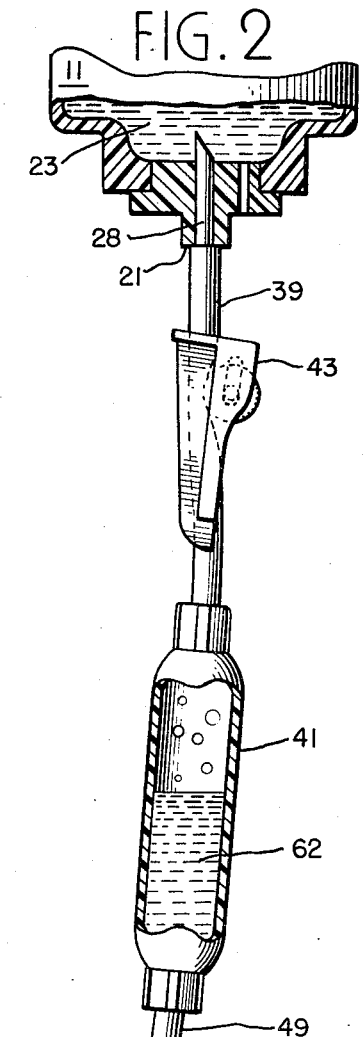
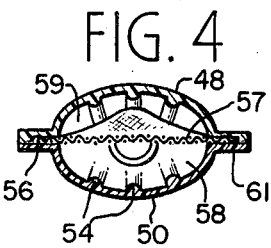
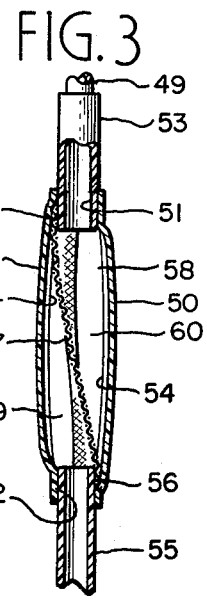
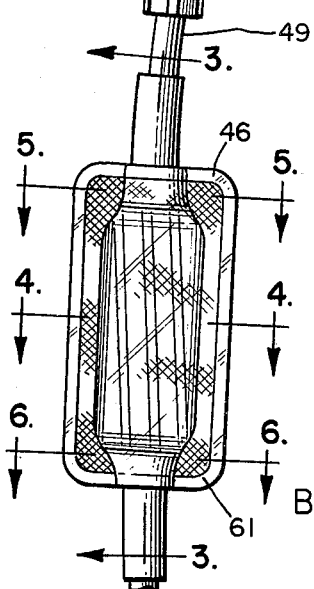
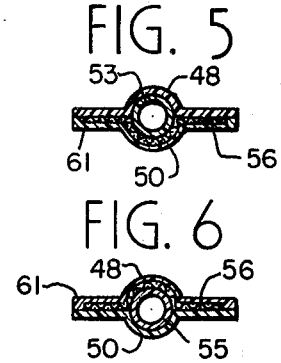
Inventor
Nat Shaye
By Richard J. Reilly
Attorney

United States Patent Office 3,506,130
Patented Apr. 14, 1970

3,506,130
FILTER ASSEMBLY FOR APPARATUS USED IN PARENTERAL ADMINISTRATION OF LIQUIDS
Nat Shaye, Morton Grove, Ill., assignor to Baxter Laboratories, Inc., Morton Grove, Ill., a corporation of Delaware
Filed Dec. 26, 1967, Ser. No. 693,373
Int. Cl. B01d 35/02
U.S. Cl. 210—436                               8 Claims

ABSTRACT OF THE DISCLOSURE

A filter comprising an assembly which extends generally diagonally with a vertical compressible housing in the vertical path of flow of liquid administered by said apparatus and thereby provides upstream and downstream vertical chambers disposed in horizontal association. The housing comprises a pair of opposite vertically disposed compressible housing members, preferably of plastic, each of said housing members being heat sealed about its edges to the other and secured to an opposite end of said filter which is trapped between an associated housing member and a corresponding inlet and outlet duct for said housing.

---

The present invention relates to parenteral administration of liquids. Particularly, the invention relates to an assembly for filtering a liquid which is administered parenterally.

A liquid for parenteral administration conventionally moves through a vertical path defined by a length of tubing from a liquid reservoir into the body of a patient. A filter body may be interposed in the length of tubing between the reservoir and a hypodermic needle by which fluid is transferred from the downstream end portion of the length of tubing into the body. The filter body minimizes the risk of entry of particulate into the patient's body with the liquid.

A filter body of a conventional parenteral administration set has relatively large pore sizes which do not interfere significantly with gas displacement during a procedure of initiating flow from a liquid reservoir to a patient. However, a requirement for filtering particulate of relatively small diameters indicates filter body pore diameters not available in conventional parenteral administration sets. If small pore filter bodies were substituted in most conventional parenteral administration sets, they would decrease, to an objectionable level, the ease with which gases could be displaced from upstream such filter bodies; and accordingly increase the difficulties encountered in initiating liquid flow through such parenteral administration sets.

It is an object of the present invention to provide improved filter assembly for apparatus used in parenteral administration of liquids.

It is another object of the present invention to provide a filter assembly adapted to facilitate initiation of flow in apparatus for parenteral administration of liquids from a fluid reservoir to a patient.

It is a further object of the invention to provide a filter assembly in a parenteral administration set from which gases are readily displaceable from upstream a filter body regardless of the sizes of its pores.

The foregoing objects are achieved by a filter assembly adapted for passage of liquids in a generally vertical direction and comprising a housing having an upper liquid inlet opening and a lower liquid outlet opening. A filter body is disposed generally diagonally of, and defines within, said housing horizontally adjoining vertically extending upstream and downstream chambers. Liquid inlet and outlet ducts are disposed in said upper liquid inlet and lower liquid outlet openings for transmission of liquid into and out of said upstream and downstream chambers respectively.

The foregoing and other objects features and advantages of the invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective schematic view of one form of the invention embodied in a parenteral administration set, with components arranged for gravity flow of liquid, parts having been broken away.

FIG. 2 is an enlarged view of a medial portion of FIG. 1, parts having been broken away.

FIG. 3 is a vertical sectional view according to line 3—3 of FIG. 2.

FIG. 4 is a horizontal view according to line 4—4 of FIG. 2.

FIG. 5 is a horizontal sectional view according to line 5—5 of FIG. 2.

FIG. 6 is a horizontal sectional view according to line 6—6 of FIG. 2.

Referring now more particularly to the drawings, a set for parenteral administration of liquids, generally designated 10, is shown as comprising a container 11 adapted as a fluid reservoir and having a generally cylindrical side wall 13, lower end section 15 and an upper wall 17. A bail assembly 19 may be provided for suspension of container 11 from a stand or other hanging fixture (not shown). Container 11 may be fabricated of a rigid plastic material and have a self-sealing penetrable lower end wall 21, which is secured in or integral with lower end section 15.

Container 11 defines a chamber 27 adapted to dispense a liquid 23 for partenteral administration. For that purpose, container 11 is adapted to be arranged in fluid communication with a patient by gravity flow through a length of tubing generally designated 25. An axially extending hollow spike 28 is proportioned to breach self-sealing wall 21 for removing fluid from chamber 27.

Length of tubing 25 comprises first conduit means 29 on a downstream end portion 31 of which a hypodermic needle 33 is arranged for passing fluids into a body opening. A tubing clamp 35 which may be constructed according to U.S. Patent No. 3,009,429 and engaged about first conduit means 29, is adapted to adjust flow through hypodermic needle 33. A Y-shaped penetrable reseal connector 37 is arranged in conduit means 29 between tubing clamp 35 and hypodermic needle 33. A conventional hypodermic needle (not shown) can be inserted into reseal connector 37 for venting trapped gases after reinitiation of flow in set 10 in a manner to be described hereinafter. Length of tubing 25 also comprises second conduit means 39 in the upstream end portion of which spike 28 is mounted for passing fluid from container 11 toward first conduit means 31.

A drip chamber 41 is sealably arranged in fluid communication with the downstream end of the tube which comprises second conduit means 39. The drip chamber may be of conventional construction and transparent fabrication so that the rate of flow through length of tubing 25 can instantaneously be ascertained. For adjustably setting the flow through said drip chamber, a clamp 43 which may be constructed similar to the clamp 35, engages about said second conduit means between said drip chamber and container 11.

A filter assembly generally designated 45 is adapted for arrangement in a vertical flow path through set 10 at the upstream end portion 47 of first conduit means 29. Fluid communication between the upstream end of filter assembly 45 and drip chamber 41 is achieved by a short flexible plastic tube section 49 which may be secured in place by heat sealing. Filter assembly 45 comprises a housing 46 which is defined by a pair of flexible, substantially like-dimensioned rectangular plastic members or sheets 48 and 50 (FIG. 3). They are secured together by a peripheral heat formed seal 61 (FIG. 2) in a manner such that space 60 (FIG. 3) within the housing is completely enclosed except for a pair of upper and lower openings 51 and 52 which are vertically spaced when operatively disposed. Housing 46 is proportioned so that when it is operatively arranged its longitudinal axis is greater than its horizontal axis. Thereby, the housing can be considered as having vertical disposition.

In the present embodiment the downstream end portion of a short duct 53 comprising a section of flexible plastic tubing, is heat-sealed in opening 51. Its opposite end portion is connected to the downstream end portion of tube section 49. The upstream end portion of a duct 55 comprising a section of flexible plastic tubing is heat-sealed within the opening 52. Its opposite end portion is connected to the upstream end portion of first conduit means 29. The arrangement is such that space 60 is wholly enclosed except for its fluid communicability within the length of tubing 25 through ducts 53 and 55.

A filter body for liquids 57 is disposed generally diagonally across space 60 in a manner such that, within said housing, there are defined a pair of horizontally adjoining vertically extending upstream and downstream chambers 58 and 59, (FIG. 3). In the illustrated embodiment, filter body 57 is a rectangular section having peripheral portions 56 which are secured by the heat seal 61, between the secured together plastic sheets 48 and 50. At housing opening 51, however, thereto adjoining peripheral portion 56 is heat-sealed between housing sheet 48 and an adjoining side of duct 53; while at the other end of housing 46, a portion 56 adjacent opening 52 is trapped between the sheet 50 and a thereto adjacent side of duct 55, as illustrated in FIGS. 3, 5, and 6.

The components of filter assembly 45 may be of exceedingly inexpensive fabrication with the filter body 57 likely being of collapsible character. If more fabric is provided than is required to assume the geometric configuration of FIG. 3, filter body 57 will have a tendency to collapse against the inside faces of plastic sheets 48 and 50 as the diagonal length of space 46 will be less than said filter body. To prevent interference with flow attendant such phenomena, a plurality of ribs 54, only some of which are numbered in FIG. 4, are provided to hold said filter body away from housing sheets 48 and 50.

Housing 46 is manually compressible, and because in its operative position it is elongated vertically, it is readily grippable for pumping to reinitiate flow, once stopped, in set 10 through the filter assembly 45. To that end, filter housing 46 must be sufficiently close to drip chamber 41 to enable a bubble to be forced through the liquid mass 62 in said drip chamber by manual pumping.

What is claimed is:

1. A filter assembly adapted for passage of liquids in a generally longitudinal direction and comprising: a housing having an upper liquid inlet opening and a lower liquid outlet opening at respective ends thereof; a flexible filter body disposed generally diagonally and defining within said housing laterally adjoining, longitudinally extending, upstream and downstream chambers, and liquid inlet and outlet ducts connected respectively to said upper liquid inlet and lower liquid outlet openings for transmission of liquid into and out of said upstream and downstream chambers, respectively, the interior of said housing being of enlarged transverse dimension with respect to said inlet and outlet ducts, to provide a filter body of increased surface area, said housing having a plurality of internal ribs extending continuously from end to end of said housing to hold said filter body away from said housing to define flow channels therein.

2. A filter assembly as defined in claim 1 in which said housing comprises a pair of opposite housing members having outer portions heat sealed each to the other and to said inlet and outlet ducts and defining a tubing section.

3. A filter assembly as defined in claim 2 in which said filter body has opposite end portions, respectively secured between one of said housing members and said inlet duct and the other of said housing members and said outlet duct.

4. A filter assembly as defined in claim 2 in which said filter body has opposite end portions, one of said end portions secured by heat sealing to said inlet duct and one of said housing members, the other of said end portions secured by heat sealing to said outlet duct and the other of said housing members.

5. In an assembly for parenteral administration of liquids and having first conduit means with a downstream end portion for passing fluids into a body opening, and second conduit means for passing fluid from a source towards said first conduit means, the combination comprising: a drip chamber mounted between and in fluid communication with said conduit means, a hollow plastic housing in fluid communication between said conduit means, the interior thereof being of enlarged transverse dimension with respect to said conduit means, said housing having a flexible filter body disposed generally diagonally and defining in said housing a pair of laterally adjoining, longitudinally extending, upstream and downstream chambers; a liquid inlet and outlet in respective ends of said housing, each leading to a different chamber, and means to selectively control liquid flow through said conduit means, housing, and drip chamber.

6. The assembly of claim 5 in which said housing has a plurality of internal ribs extending continuously from end to end of said housing to hold said filter body away from said housing to define flow channels therein.

7. A combination according to claim 5 in which the said housing is manually flexible for pumping air through said filter body and from said housing to reinitiate liquid flow once halted.

8. A combination according to claim 5 and having venting means for removing air from said assembly.

References Cited
UNITED STATES PATENTS

| | | | |
|---|---|---|---|
| 1,495,825 | 5/1924 | Von Gunten | 210—455 X |
| 2,765,923 | 10/1956 | Novak | 210—499 X |
| 3,217,889 | 11/1965 | Berg | 210—499 X |

J. L. DeCESARE, Primary Examiner

U.S. Cl. X.R.

210—446, 455, 499